US012344127B2

(12) United States Patent
Verho et al.

(10) Patent No.: US 12,344,127 B2
(45) Date of Patent: Jul. 1, 2025

(54) METHOD AND ARRANGEMENT FOR CONTROLLING ELECTRIC CURRENT IN TETHER CABLE OF MINING VEHICLE

(71) Applicant: SANDVIK MINING AND CONSTRUCTION OY, Tampere (FI)

(72) Inventors: Samuli Verho, Tampere (FI); Harri Vatanen, Tampere (FI); Tommi Tiihonen, Tampere (FI); Mikko Kouvo, Tampere (FI); Raimo Juntunen, Tampere (FI); Mikko Kitula, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 802 days.

(21) Appl. No.: 17/612,490

(22) PCT Filed: May 20, 2020

(86) PCT No.: PCT/EP2020/064097
§ 371 (c)(1),
(2) Date: Nov. 18, 2021

(87) PCT Pub. No.: WO2020/234366
PCT Pub. Date: Nov. 26, 2020

(65) Prior Publication Data
US 2022/0242249 A1   Aug. 4, 2022

(30) Foreign Application Priority Data
May 22, 2019   (EP) ..................................... 19175916

(51) Int. Cl.
*B60L 9/00* (2019.01)
*B60L 50/53* (2019.01)
(Continued)

(52) U.S. Cl.
CPC ................. *B60L 9/00* (2013.01); *B60L 50/53* (2019.02); *B60L 53/18* (2019.02); *B60L 53/302* (2019.02);
(Continued)

(58) Field of Classification Search
CPC .......... B60L 9/00; B60L 50/53; B60L 53/302; B60L 53/18; B60L 2200/40; B60L 2240/12; B60L 2240/36; B60L 2260/50; E02F 9/00
See application file for complete search history.

(56) References Cited

U.S. PATENT DOCUMENTS 5,887,815 A   3/1999   Pierce
7,069,124 B1   6/2006   Whittaker et al.
(Continued)

FOREIGN PATENT DOCUMENTS

| DE | 102017106619 A1 | 10/2018 | |
| EP | 3037297 A1 * | 6/2016 | ............ B60L 11/005 |
| WO | 2020234366 A1 | 11/2020 | |

OTHER PUBLICATIONS

Black W Z et al: "Ampacities of power cables wound on reels", IEEE Transactions on Power Delivery, IEEE Service Center, New York, NY, US. vol. 9, No. 3, Jul. 1, 1994, pp. 1209-1216.
(Continued)

*Primary Examiner* — Robert J McCarry, Jr.
(74) *Attorney, Agent, or Firm* — Corinne R. Gorski

(57) ABSTRACT

A method and arrangement are provided for controlling electric current in a tether cable of an electrically driven mining vehicle. An indicator of an equivalent cycle current that flows through said tether cable is determined, and one or more descriptors of an actual state of dynamically changing conditions of the tether cable are obtained. A current limiting value is determined on the basis of the indicator and
(Continued)

the descriptors, and a total amount of current is limited that the mining vehicle draws through the tether cable to a value smaller than or equal to the determined current limiting value.

8 Claims, 5 Drawing Sheets

(51) Int. Cl.
    *B60L 53/18*     (2019.01)
    *B60L 53/302*     (2019.01)
    *E02F 9/00*     (2006.01)

(52) U.S. Cl.
    CPC ....... *B60L 2200/40* (2013.01); *B60L 2240/12* (2013.01); *B60L 2240/36* (2013.01); *B60L 2260/50* (2013.01); *E02F 9/00* (2013.01)

(56) References Cited

U.S. PATENT DOCUMENTS

2014/0125655 A1     5/2014     Kunath et al.
2015/0268058 A1     9/2015     Samarasekera et al.

OTHER PUBLICATIONS

M.R. Yenchek et al: "Impact on Current Load on Mine Trailing Cable Thermal Life", Bureau of Mines Information Circular 9278, Jan. 1, 1991, Retrieved from the Internet: URL: https://books.googleeusercontent.com/books/content.

* cited by examiner

METHOD AND ARRANGEMENT FOR CONTROLLING ELECTRIC CURRENT IN TETHER CABLE OF MINING VEHICLE

RELATED APPLICATION DATA

This application is a § 371 National Stage Application of PCT International Application No. PCT/EP2020/064097 filed May 20, 2020 claiming priority to EP 19175916.6 filed May 22, 2019.

FIELD OF THE INVENTION

The invention relates in general to electrically driven mining vehicles, such as electrically driven loaders, drilling jumbos, or the like. In particular the invention relates to the task of controlling how much current flows through a tether cable of such a mining vehicle.

BACKGROUND OF THE INVENTION

Electrically driven mining vehicles have a number of advantages in comparison to ones driven with internal combustion engines, such as the absence of exhaust fumes and the independence from fuel delivery. As long as battery technology does not allow high enough storage densities of electric energy it is not feasible to assume that heavy mining vehicles could rely solely on onboard batteries for meaningful lengths of time in operation. A conventional solution is to build an electricity grid in the mine, to which the electrically driven mining vehicle connects with a long cable, a sufficient length of which is rolled out from a cable drum or reel at the back of the vehicle.

FIG. 1 illustrates schematically some components of a conventional electrically driven mining vehicle. The electricity grid 101 of a mine comprises connection points 102, to which the connector 103 of the mining vehicle can be coupled. A sufficient length of a tether cable 104 is rolled out of a drum or reel 105 to allow the vehicle to reach its working location. A transformer 106 may be used to transform the grid voltage, typically in the order of 1000V AC, to a lower voltage level such as 400V AC that can be fed into an induction motor 107. Another possibility is to rate the induction motor 107 directly to the grid voltage, in which case the transformer 106 is not needed, as shown by the dashed-line connection 114 in FIG. 1. A torque converter 108 couples the induction motor 107 to the transmission 109 of the vehicle, from which there are drive shafts 110 and 111 to the driving wheels 112 and 113. A hydraulic pump can be connected directly to the transmission where it rotates always when the electric motor receives electric power from the grid, so that hydraulic power is controlled with choking valves. As an alternative electric power can be taken from e.g. the secondary side of the transformer 106, to hydraulic pumps that are used to maintain pressure in the hydraulic systems that are used for the working mechanisms, for automatically operating the cable reel 105, and other such purposes.

FIG. 2 illustrates an alternative solution, in which the cable connection between the electrically driven mining vehicle and the electricity grid is a DC cable connection. The connection point 213 is equipped with a transformer and a rectifier 212, and the onboard power link 201 of the mining vehicle is a DC power link. In the embodiment of FIG. 2 the traction motor 203 and its associated transmission 204 are driven by an inverter 202, and other inverters 205 and 206 may be used to drive other onboard systems that contain AC motors 207 and 208. A tramming battery 209 is provided and coupled to the DC power link 201 through a converter 210 that may comprise DC/DC conversion, battery charging, and charge level management functions.

The current rating of the tether cable 104 may become a limiting factor for the operation of an electrically driven mining vehicle. Trying to draw an excessive current through the tether cable 104 would cause the conductor material of the cable to heat up, which has disadvantageous effects on the insulating sheath layers of the cable. In an extreme case the insulating material may melt or burn causing an immediate failure, but even less critical levels of heating cause accelerated deterioration of its characteristics. Cable that has been rolled out of the drum or reel 105 dissipates heat much more effectively than cable rolled tight.

Attempting to just estimate beforehand how large currents will be encountered during use may lead to excessive limiting of current, or to the use of cable so thick that only a limited length of it can fit in the space available on board the mining vehicle. In order to enable using an optimal length of an optimally thick cable, more intelligent and versatile ways of limiting the current would be highly desirable.

SUMMARY

It is an objective of the invention to present a method and arrangement for controlling an electric current in the tether cable of a mining vehicle so that the capacity of the cable can be optimally utilized. Another objective of the invention is to present such a method and arrangement that enable optimizing the utilization of electric power on board an electrically driven mining vehicle.

These and further advantageous objectives are achieved with a method and arrangement that have the features listed in the respective appended independent claims. The depending claims describe further advantageous embodiments of the invention.

According to an aspect there is provided a method for controlling electric current in a tether cable of an electrically driven mining vehicle. The method comprises determining an indicator of an equivalent cycle current that flows through said tether cable, obtaining one or more descriptors of an actual state of dynamically changing conditions of the tether cable, determining a current limiting value on the basis of said indicator and said descriptors, and limiting a total amount of current that said mining vehicle draws through said tether cable to a value smaller than or equal to said determined current limiting value.

According to an embodiment said indicator of an equivalent cycle current comprises an indicator of past equivalent cycle current that has flown through said tether cable during a recent duration of time. This involves the advantage that actual happenings of the recent past can be taken into account in determining the current limiting value.

According to an embodiment said indicator of the past equivalent cycle current is determined as a cumulative sum of momentary electric current values occurred in said tether cable divided by the length of said recent duration of time. This involves the advantage that a reasonably accurate indicator of the actually occurred current can be obtained in a relatively simple and robust way.

According to an embodiment said indicator of an equivalent cycle current comprises an indicator of future equivalent cycle current that is expected to flow through said tether cable during a future duration of time. This involves the advantage that setting the current limiting value can be made proactively, giving more versatile control.

According to an embodiment the method comprises obtaining an indicator of a driving speed of the mining vehicle, and calculating the indicator of future equivalent cycle current at least partly on the basis of the obtained indicator of the driving speed. This involves the advantage that the most probable rolled-out amount of cable in the near future can be taken into account in setting the current limiting value.

According to an embodiment the method comprises obtaining an indicator of an estimated length of a working cycle, and calculating the indicator of future equivalent cycle current at least partly on the basis of the obtained indicator of the estimated length of the working cycle. This involves the advantage that information about the most possible working schedule can be taken into account beforehand in the process of setting the current limiting value.

According to an embodiment the method comprises obtaining an indicator of an estimated length of an idle cycle, and calculating the indicator of future equivalent cycle current at least partly on the basis of the obtained indicator of the estimated length of the idle cycle. This involves the advantage that information about the most possible working schedule can be taken into account beforehand in the process of setting the current limiting value.

According to an embodiment said one or more descriptors of the actual state of dynamically changing conditions of the tether cable comprise one or more of: an amount of said tether cable presently contained in a cable storage space of said mining vehicle; a temperature of a portion of said tether cable; a temperature of said cable storage space. This involves the advantage that easily detectable actual conditions can have a dynamic effect on setting the current limiting value, leading to better accuracy in setting it at a reasonable level.

According to an embodiment the method comprises responding to a momentary demand of electric power within the mining vehicle that is larger than allowed by the determined current limiting value, by temporarily boosting the amount of electric energy available on an onboard power link of the mining vehicle with electric energy drawn from a battery onboard the mining vehicle. This involves the advantage that more power may become available, at least temporarily, than what the cable connection alone could give.

According to a second aspect there is provided an arrangement for controlling electric current in a tether cable of an electrically driven mining vehicle. The arrangement comprises a processing unit configured to determine an indicator of an equivalent cycle current that flows through said tether cable, to obtain one or more descriptors of an actual state of dynamically changing conditions of the tether cable, and to determine a current limiting value on the basis of said indicator and said descriptors; and a current limiter configured to limit a total amount of current that said mining vehicle draws through said tether cable to a value smaller than or equal to said determined current limiting value.

According to an embodiment the arrangement comprises a voltage converter configured to convert a cable voltage of said tether cable into a power link voltage of an onboard power link of the mining vehicle, and said current limiter is configured to control said voltage converter to make said voltage converter select said power link voltage in dependence with said current limiting value.

According to an embodiment the processing unit is configured to perform the method steps of any of the method embodiments described above. The advantages involved are the same as have been explained above with reference to the method embodiments.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
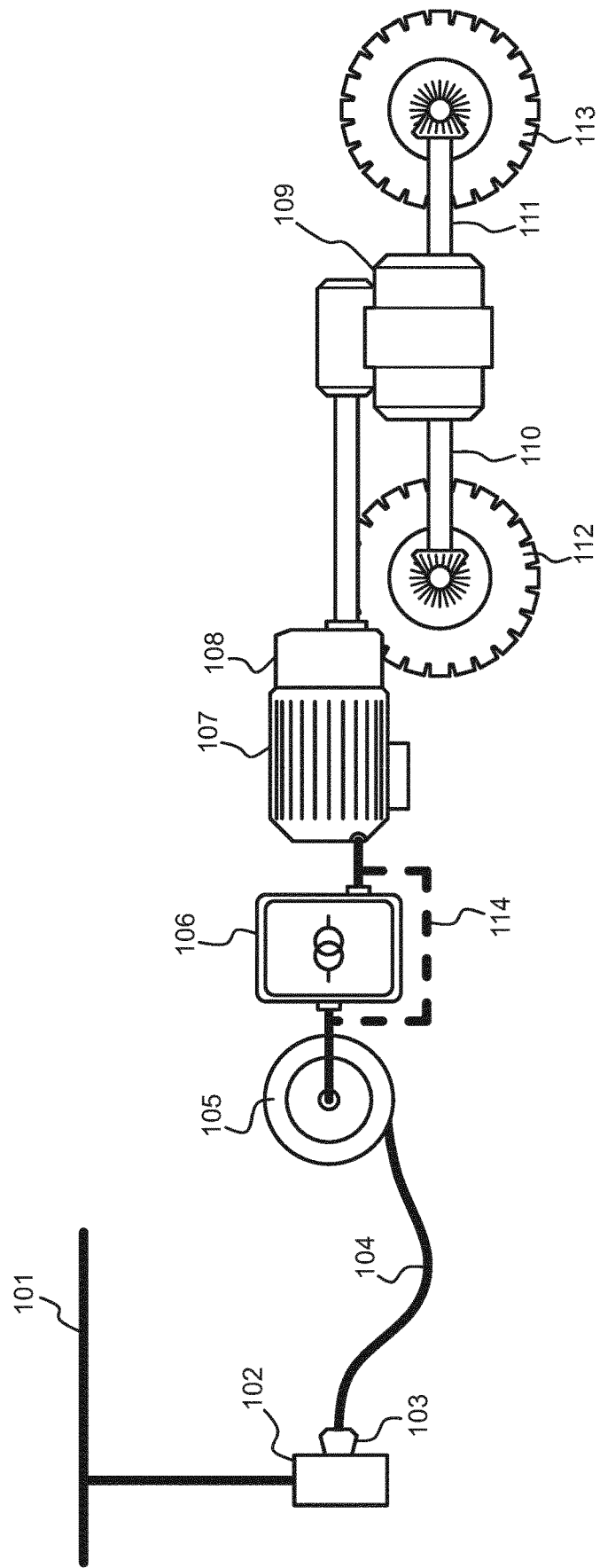
FIG. 1 illustrates an electrically driven mining vehicle.
Figure 2:
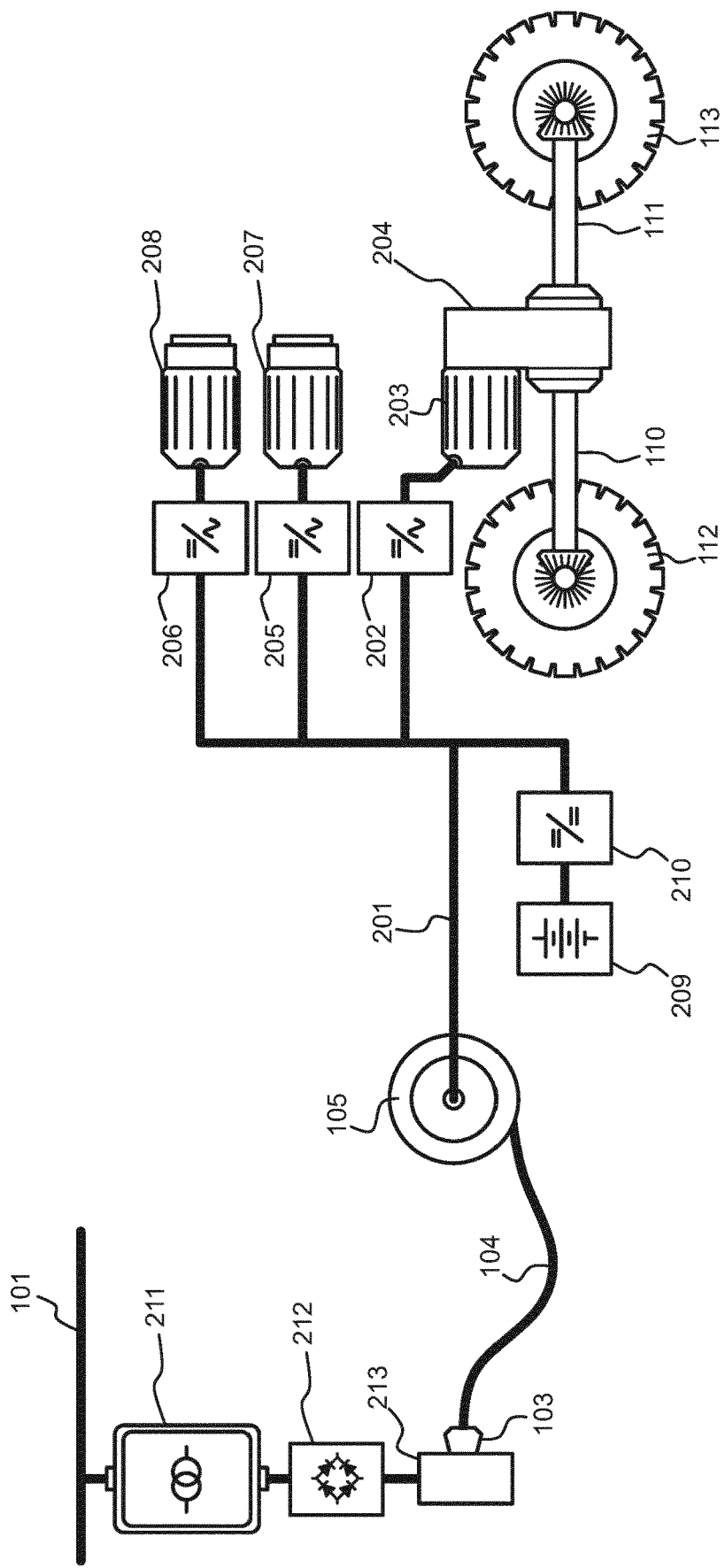
FIG. 2 illustrates another electrically driven mining vehicle.
Figure 3:
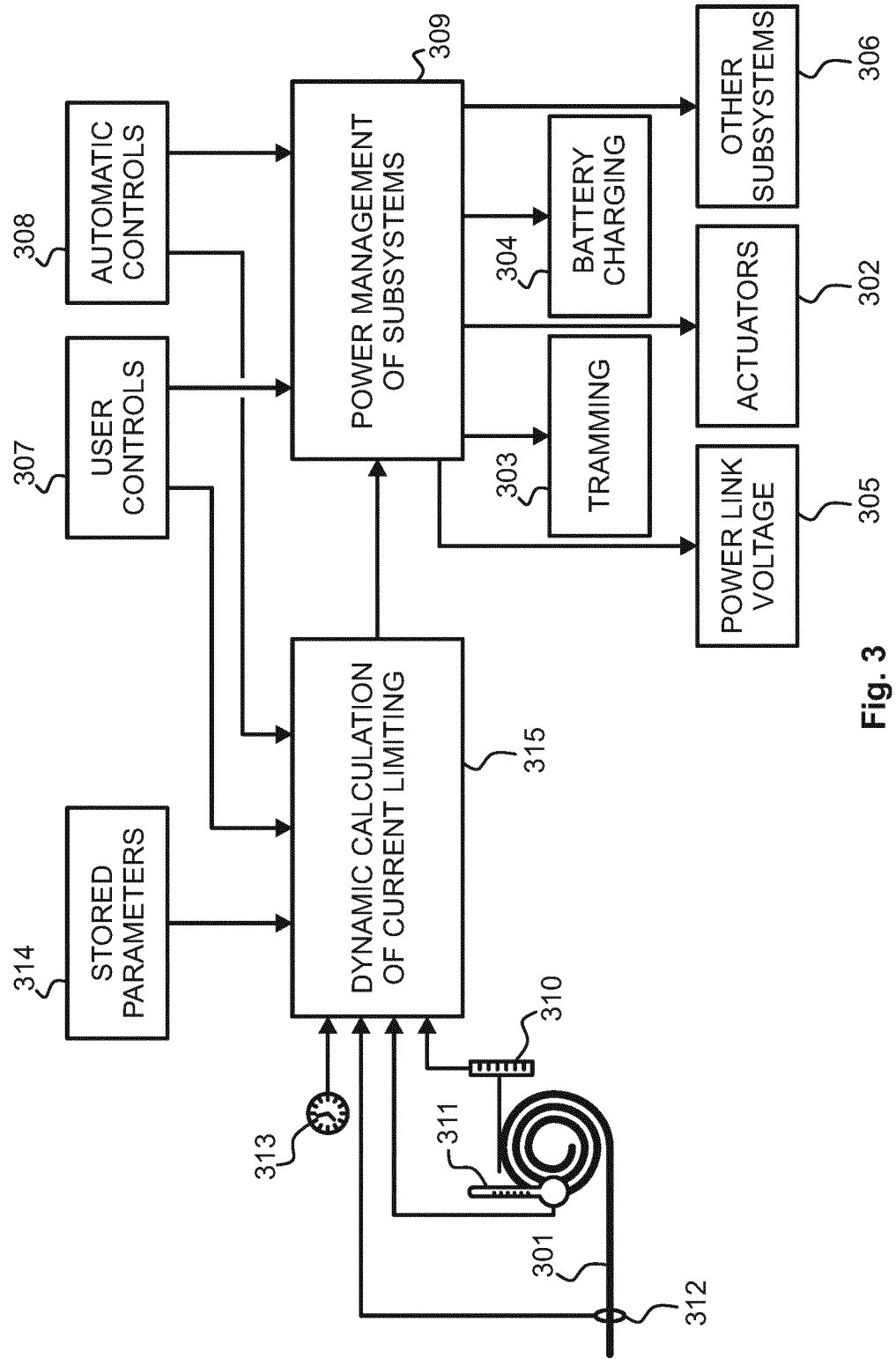
FIG. 3 illustrates a principle of dynamically controlling the current limiting in an electrically driven mining vehicle.

FIG. 3 illustrates schematically some parts of an electrically driven mining vehicle. A tether cable 301 is used to connect the mining vehicle to an external source of electric energy, such as the electricity grid of a mine or other environment in which the mining vehicle is to be used, a dedicated electricity delivery station, or a generator carriage for example. Various subsystems on board the mining vehicle are to be driven with electric energy that is received from the external source of electric energy through the tether cable 301. Examples of such subsystems are for example actuators 302, which means for example the lifting mechanisms that a loader uses to move its bucket. Another example of an electrically driven subsystem onboard is the tramming system 303, which means the traction mechanism of the vehicle and its motors. A battery charging subsystem 304 is also shown, covering generally all rechargeable storage means of electric energy onboard as well as the means for controlling their state of charge. The power link voltage subsystem 305 comprises means for managing the voltage(s) of the power link(s) of the mining vehicle, for example for maintaining a particular voltage level of a power bus that is used to distribute electric energy from the cable connection and/or from an onboard battery to the various other subsystems. Other subsystems 306 may comprise supporting systems such as lights, ventilation, communications, data collection and storage, and the like.

The mining vehicle may comprise various kinds of user controls 307 meant for use as a command interface through which a human user can control operations of the mining vehicle. If the mining vehicle is of a manned type where the user is actually onboard, the user controls 307 may comprise control means used in a driver cabin such as joysticks, steering wheels, buttons, control levers, keyboards, touch-sensitive screens, and the like. If the mining vehicle is of a remotely controlled kind, similar user controls may be located at a remote control stations, so that the onboard user controls 307 are only means for communication that convey the remotely given commands to the appropriate parts of the mining vehicle.

The mining vehicle may comprise also automatic controls 308 that control at least some of the operations of the mining vehicle without user interaction. Examples of automatic controls include for example the control system that manages the cable reel or drum in order to have just the appropriate amount of tether cable out at all times. There is not necessarily a sharp distinction between user controls 307 and automatic controls 308, because many control functions may involve varying degrees of autonomous operation while simultaneously allowing the user to override or direct them if necessary. An example of a case where both user control and automatic control is involved simultaneously is one where the user activates brakes to slow down a movement of the vehicle, and an automatic system decides to what extent the braking can be done by regenerating electric energy from the kinetic energy of the movement and how much (if any) such regenerating needs to be augmented with the use of a hydraulic or mechanical brake that just converts the kinetic energy into heat.

The user controls 307 and automatic controls 308 have an effect on the power management 309 of the subsystems. As a simple example a user who accelerates the vehicle forward essentially commands more power to be directed to the tramming subsystem 303. The total momentary power directed to all subsystems by the power management functionality 309 defines the momentary amount of electric current that needs to be drawn through the tether cable 301. There is obviously a limit of how much electric current can be drawn, so the extent to which the commands from the user controls 307 and automatic controls 308 may actually affect the delivery of power to the subsystems has its limits. In particular, the electric current drawn through the tether cable 301 should be limited to smaller than a current limiting value in order to be sure that excessive current does not cause harmful or dangerous consequences such as hazardous overheating of any portion of the tether cable 301.

In a method for controlling the electric current in the tether cable 301 of the electrically driven mining vehicle it is advantageous to determine an indicator of an equivalent cycle current that flows through the tether cable 301. An equivalent cycle current is an amperage value that tells, which constant amount of continuous electric current would cause the same loading of the tether cable (and consequently the same amount of heating) as the actual, possibly cyclically varying AC or DC RMS (Root Mean Square) current. When speaking about equivalent cycle current that "flows" through the tether cable, one may mean either a past current that has flown through the cable or a future current that is expected to flow through the tether cable, or both. These cases (past current and future current) will be discussed in more detail later in this text.

In the method for controlling the electric current in the tether cable 301 of the electrically driven mining vehicle it is also advantageous to obtain one or more descriptors of an actual state of dynamically changing conditions of the tether cable 301. Dynamically changing conditions are such that change over time during normal use of the mining vehicle, often irregularly enough and tightly enough bound to the way in which the mining vehicle is used so that anticipating their changes accurately would be difficult or impossible. Examples of descriptors of the actual state of dynamically changing conditions of the tether cable include but are not limited to an amount of the tether cable presently contained in the cable storage space of the mining vehicle, a temperature of a portion of the tether cable, and a temperature of the cable storage space. In FIG. 3 these are schematically represented as the cable amount sensor 310 and the temperature sensor 311.

Measuring the amount of the tether cable presently contained in the cable storage space of the mining vehicle can be replaced or augmented with its complement, which is measuring the amount of the tether cable that has been rolled out. The idea here is to estimate, how much of the tether cable is on the reel or drum or otherwise tightly packed so that its possibilities of dissipating generated heat are much more limited than if it would be in free space. The larger the proportion of the cable has been rolled out, the more it can be allowed to generate heat and consequently the more current can be drawn through it without risking overheating.

Measuring a temperature, either directly from the cable or indirectly from the cable storage space or its immediate surroundings gives an indication of how much the cable has heated up already. The higher its current temperature, the less there is room for additional heating. Also, repeatedly measuring the temperature and combining this information with information about how much current has actually flown through the cable and how much of the cable has been tightly packed accumulates knowledge about how would each possible amount of current affect the temperature in the future.

FIG. 3 shows also schematically means 312 for measuring the actual value of electric current flowing through the tether cable 301, and means 313 for providing information about time. Additionally there may be stored parameters 314 of any kind, such as critical temperature values that should not be exceeded, the length of the cable and the characteristics of the storage space (that can be used to calculate the amount of tightly packed cable, if the amount of rolled-out cable is measured), and the like.

Any or all of the indicators, descriptors, and other information introduced above can be used to determine a current limiting value on the basis thereof. In other words, the functionality that is represented as block 315 in FIG. 3 may be used to dynamically determine, how much current can be allowed to flow through the tether cable 301 in the nearest future. In the schematic representation of FIG. 3 the determined current limiting value is provided as input information to the power management 309, the aim being to tell the power management 309 how much total power it has available for allocating to all of the various subsystems.

As a first option we may consider a reactive form of current limiting, in which the indicator of an equivalent cycle current mentioned above comprises an indicator of past equivalent cycle current that has flown through said tether cable during a recent duration of time. The indicator may be determined for example as a cumulative sum of momentary electric current values occurred in the tether cable divided by the length of said recent duration of time. The momentary electric current values meant here are absolute values, because any flowing current causes heating regardless of its direction. By combining such accumulated information about how much current has recently flown in the tether cable with information about e.g. the current temperature of the cable and its most recent trend of development it is possible to deduce, whether the current in the tether cable can be allowed to continue on the same level or whether it can be increased (as a reaction to the temperature not showing excessively high values or increasing trend) or whether it must be decreased (as a reaction to the temperature showing excessively high values or increasing trend).

As a second option we may consider a predictive form of current limiting, in which the indicator of an equivalent cycle current comprises an indicator of future equivalent cycle current that is expected to flow through the tether cable during a future duration of time. There is a variety of information that can be obtained and utilized for such predictive current limiting.

One form of such information is an indicator of a driving speed of the mining vehicle. It may be sufficient to obtain an indicator of whether the speed is positive (i.e. directed away from a starting position in which the tether cable was connected to a connection point) or negative (i.e. directed towards the connection point). Taken these definitions a positive speed means that more cable is being rolled out of the storage space, which in turn means that heat will be dissipated more effectively from the tether cable as a whole in the near future. Respectively a negative speed means that more cable is being rolled in to the storage space, with the respective consequences to its capability of dissipating generated heat. Additionally or alternatively the indicator of driving speed may indicate a magnitude of the speed. A speed of high magnitude means a higher probability that the mining vehicle is in the course of moving a long distance, which means e.g. a higher probability that the tramming subsystem will require a large amount of power for a significant future duration of time. An indicator of future equivalent cycle current can be calculated at least partly on the basis of the obtained indicator of the driving speed.

Another form of information that can be obtained and utilized for predictive current limiting is an indicator of an estimated length of a working cycle. It is typical to mining vehicles that their use obeys a fairly regular timetable, for example because mining proceeds in alternating turns of drilling, blasting, and loading. The driver of a loader may know that even if the loader needs to work hard for a next period of (at least approximately) known duration, after that there will be an idle period of little or no use at all. Information of this kind may come even automatically from a control system of the mine or other site of usage. A slightly higher current limiting value can be allowed for the currently active working period, knowing that the slight overheating that is likely to occur can be compensated for by allowing ample time for the heated parts of the vehicle to cool down after that.

What has been said above about obtaining an indicator of an estimated length of a working cycle can be similarly said about obtaining an indicator of an estimated length of an idle cycle. The indicator of future equivalent cycle current may be calculated at least partly on the basis of the obtained indicator of the estimated length of the idle cycle.

An indicator of a future equivalent cycle current may be more versatile than a single value. It may comprise a profile of equivalent cycle current values that are expected to flow through the tether cable a various moments of a future duration of time. Additionally or alternatively a single value can be calculated that takes into account the estimated fluctuations to smaller and larger actual current values in time. This may allow momentarily using higher current limiting values than would otherwise be possible. It may be assumed, for example, that the working schedule of a mining vehicle defines a path that the mining vehicle will drive through fairly regularly. The path may contain uphill and downhill sections. Accumulated information about factors like measured power consumption, measured acceleration, measured attitude, and detected location may tell that, taken a current situation and what has happened in the past there will next be a steep uphill for 20 metres after which the path continues downhill for 380 metres. If a constant current limiting value was applied, the mining vehicle might be required to drive the relatively short uphill section at a very slow speed, in order not to make the power requirements of the tramming subsystem exceed the fixed current limiting value. Predictive current limiting of the kind described above may allow a slightly larger current to be drawn for the duration of the uphill section, counting on that the downhill section will come thereafter and allow the heated cable to cool down.

Reactive and predictive forms of current limiting can be combined. One possibility of such combining is to calculate the current limiting value as a weighted sum of what reactive and predictive current limiting would give separately. Weights for such weighted summing can be obtained for example by observing, over a longer duration of time, how accurate each of these forms has been in producing a good current limiting value, or how many later changes had to be made to current limiting based on one or the other because some safety limit or efficiency threshold was triggered by applying a calculated current limiting value. Another possibility of such combining is to estimate the reliabilities of what reactive and predictive current limiting would give separately, for example by using statistical reliability analysis methods, and select the current limiting value that is associated with best estimated reliability. Yet another possibility is to allow input information given by a user or other reliable source to override other input information in determining the new current limiting value, for example when the user knows that a long idle period is expected after a very brief but intensive working period. Also other ways of combining reactive and predictive forms of current limiting can be presented.

The method may also comprise responding to a momentary demand of electric power within the mining vehicle that is larger than allowed by the determined current limiting value, by temporarily boosting the amount of electric energy available on an onboard power link of the mining vehicle with electric energy drawn from a battery onboard the mining vehicle. Such a method could be used instead of or in addition to drawing a slightly higher current through the cable in the uphill-downhill example explained above. The mining vehicle could use some of the charge stored in the battery during the uphill section to boost the power available for the tramming subsystem. During the downhill section the mining vehicle could implement at least some of the necessary braking through regenerating electric energy and storing it back to the battery, to make up for the charge that was depleted therefrom during the uphill section.

Figure 4:
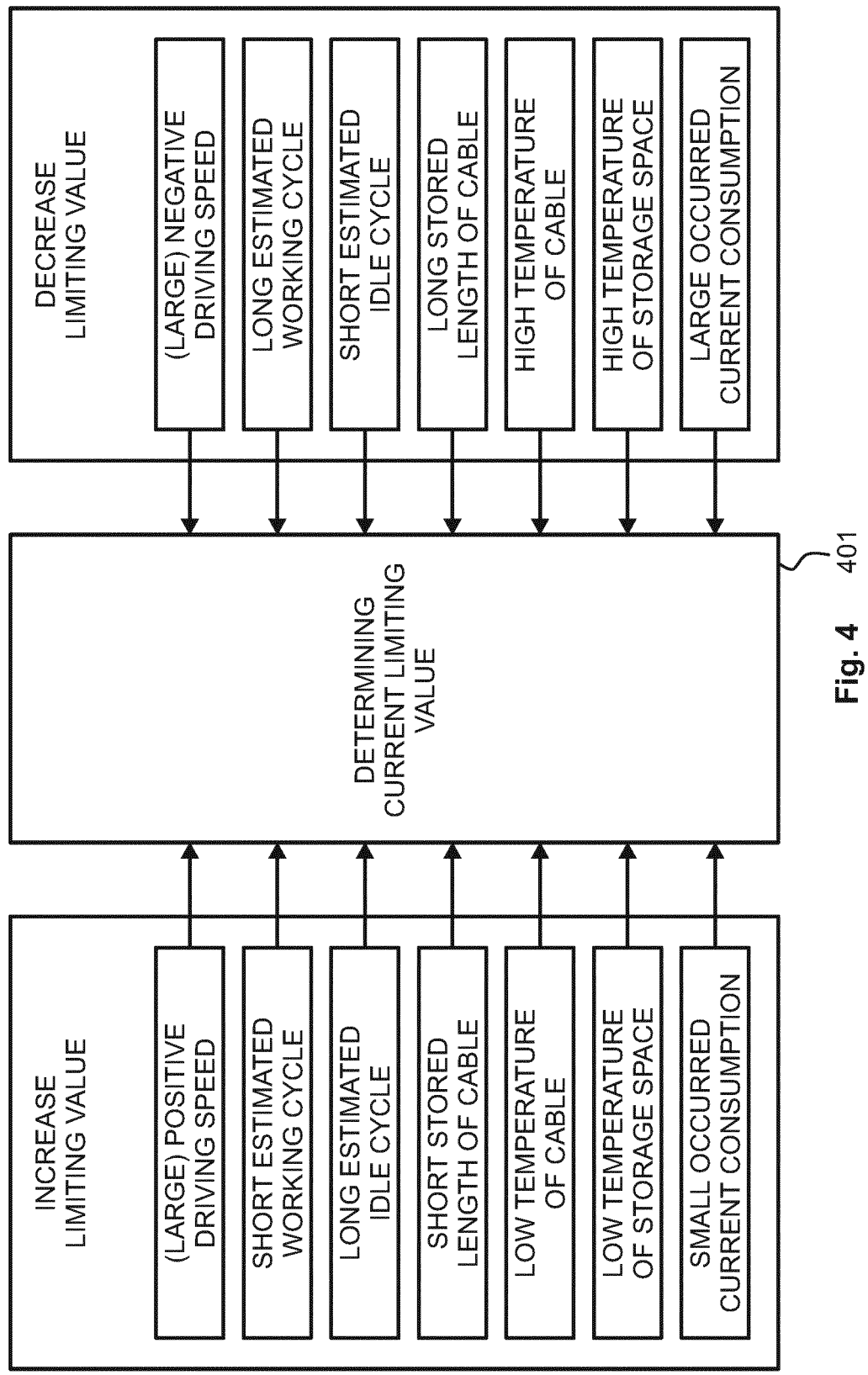
FIG. 4 illustrates possible aspects of determining a current limiting value.

FIG. 4 shows schematically how an electrically driven mining vehicle of the kind described above may comprise a processing unit 401 that is configured to determine an indicator of an equivalent cycle current that flows through the tether cable. The processing unit 401 is also configured to obtain one or more descriptors of an actual state of dynamically changing conditions of the tether cable, and to determine a current limiting value on the basis of said indicator and said descriptors.

As factors that advocate increasing the current limiting value are shown a (possibly large) positive driving speed, a short estimated working cycle, a long estimated idle cycle, a (relatively) short stored length of the cable, a low temperature of the cable, a low temperature of the cable storage space, and a small recently occurred current consumption. The opposites of these are shown as factors that advocate decreasing the current limiting value.

The processing unit 401 may be a computer that is programmed to execute a suitable control program. The computer may be (a part of) the onboard processing unit of the mining vehicle, or it may be a dedicated computing apparatus located elsewhere than in the onboard processing unit of the mining vehicle.

Figure 5:
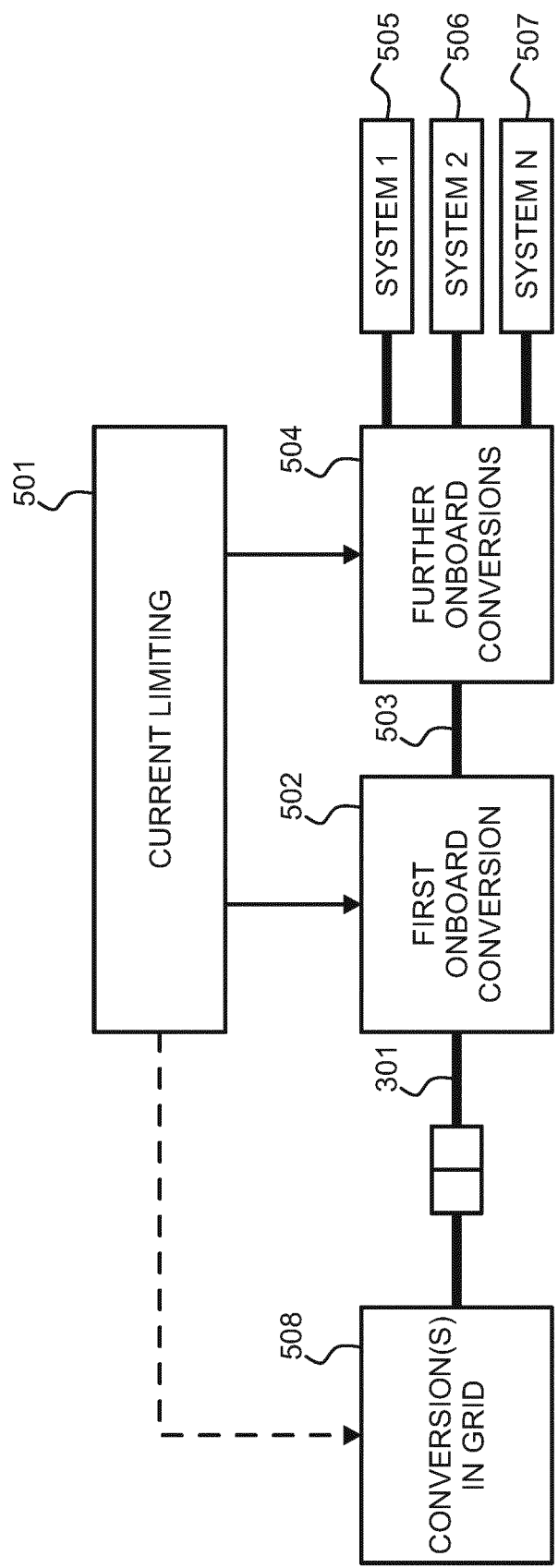
FIG. 5 illustrates examples of ways in which current limiting can be implemented.

FIG. 5 shows schematically how the electrically driven mining vehicle may comprise a current limiter 501 that is configured to limit a total amount of current that the mining vehicle draws through its tether cable 301 to a value smaller than or equal to the determined current limiting value. One way of implementing such current limiting is to affect the voltage conversions on the power link of the mining vehicle. In FIG. 5 it is assumed that the arrangement comprises a first voltage converter 502 that is configured to convert a cable voltage of the tether cable 301 into a power link voltage of an onboard power link 503 of the mining vehicle. From the onboard power link 503 there may be further voltage conversions 504 to the voltages required by the various subsystems 505 to 507 of the mining vehicle. The current limiter 501 is configured to control at least the voltage converter 502 to make it select the power link voltage in dependence with the current limiting value. The difference between the cable voltage and the power link voltage then eventually defines the amount of current that will be drawn through the tether cable 301.

As the dashed line shows in FIG. 5 it is not excluded that the current limiter in the electrically driven mining vehicle could have even some power to give commands to voltage conversions 508, if any, in the electricity grid with the same purpose, i.e. setting the difference between the (grid-originating) cable voltage and power link voltage to a suitable value that then defines the amount of current flowing through the tether cable 301. This kind of indirect control can be implemented for example so that a communications unit of the mining vehicle transmits a request to a central control system of the mine, which then decided whether the request can be accepted or not.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A method for controlling electric current in a tether cable of an electrically driven mining vehicle, the method comprising:
    determining an indicator of an equivalent cycle current that flows through said tether cable, wherein said indicator of an equivalent cycle current comprises an indicator of future equivalent cycle current that is expected to flow through said tether cable during a future duration of time, wherein the indicator of future equivalent cycle current is based, at least in part, on at least one of an indicator of a driving speed of the mining vehicle, an indicator of an estimated length of a working cycle of the mining vehicle, and an indicator of an estimated length of an idle cycle of the mining vehicle;
    obtaining one or more descriptors of an actual state of dynamically changing conditions of the tether cable;
    determining a current limiting value on the basis of said indicator of an equivalent cycle current and said descriptors; and
    limiting a total amount of current that said mining vehicle draws through said tether cable to a value smaller than or equal to said determined current limiting value.

2. The method according to claim 1, wherein said indicator of an equivalent cycle current includes an indicator of past equivalent cycle current that has flown through said tether cable during a recent duration of time.

3. The method according to claim 2, wherein said indicator of the past equivalent cycle current is determined as a cumulative sum of momentary electric current values occurred in said tether cable divided by the length of said recent duration of time.

4. The method according to claim 1, wherein said one or more descriptors of the actual state of dynamically changing conditions of the tether cable include one or more of an amount of said tether cable presently contained in a cable storage space of said mining vehicle, a temperature of a portion of said tether cable, and a temperature of said cable storage space.

5. The method according to claim 1, further comprising responding to a momentary demand of electric power within the mining vehicle that is larger than allowed by the determined current limiting value, by temporarily boosting the amount of electric energy available on an onboard power link of the mining vehicle with electric energy drawn from a battery onboard the mining vehicle.

6. An arrangement for controlling electric current in a tether cable of an electrically driven mining vehicle, the arrangement comprising:
    a processing unit configured to determine an indicator of an equivalent cycle current that flows through said tether cable, to obtain one or more descriptors of an actual state of dynamically changing conditions of the tether cable, and to determine a current limiting value on the basis of said indicator and said descriptors; and
    a current limiter configured to limit a total amount of current that said mining vehicle draws through said tether cable to a value smaller than or equal to said determined current limiting value;
    wherein said indicator of an equivalent cycle current comprises an indicator of future equivalent cycle current that is expected to flow through said tether cable during a future duration of time, wherein the indicator of future equivalent cycle current is based, at least in part, on at least one of an indicator of a driving speed of the mining vehicle, an indicator of an estimated length of a working cycle of the mining vehicle, and an indicator of an estimated length of an idle cycle of the mining vehicle.

7. The arrangement according to claim 6, further comprising a voltage converter configured to convert a cable voltage of said tether cable into a power link voltage of an onboard power link of the mining vehicle, wherein said current limiter is configured to control said voltage converter to make said voltage converter select said power link voltage in dependence with said current limiting value.

8. The arrangement according to claim 6, wherein said processing unit is configured to perform the method steps of:
    determining an indicator of an equivalent cycle current that flows through said tether cable;
    obtaining one or more descriptors of an actual state of dynamically changing conditions of the tether cable;
    determining a current limiting value on the basis of said indicator and said descriptors; and
    limiting a total amount of current that said mining vehicle draws through said tether cable to a value smaller than or equal to said determined current limiting value.

* * * * *